Dec. 11, 1962   J. A. SUGDEN   3,068,177
FERROELECTRIC CERAMIC MATERIALS
Filed Sept. 14, 1959   2 Sheets-Sheet 1

INVENTOR.
JOHN ANTHONY SUGDEN
BY
ATTORNEY

United States Patent Office 3,068,177
Patented Dec. 11, 1962

3,068,177
FERROELECTRIC CERAMIC MATERIALS
John Anthony Sugden, Horsell, Woking, England, assignor to Brush Crystal Company Limited, Hythe, Southampton, England, a corporation of Great Britain
Filed Sept. 14, 1959, Ser. No. 839,756
Claims priority, application Great Britain Sept. 15, 1958
11 Claims. (Cl. 252—62.9)

This invention relates broadly to compositions of matter and articles of manufacture fabricated therefrom. More particularly, the invention pertains to novel ferroelectric ceramics which are polycrystalline aggregates of certain constituency, as hereinafter described, fired to ceramic maturity and thereafter polarized or capable of being polarized to impart thereto electromechanical transducing properties similar to the well-known piezoelectric effect. The invention also encompasses the unreacted physical mixtures of raw ingredients which are the precursors of such ceramic materials, the reacted product of such mixtures and the articles of manufacture such as electromechanical transducers fabricated from the matured ceramic. It will be understood that the term "ceramic compositions" as used hereinafter is intended to encompass unreacted physical mixtures as well as reacted mixtures and the matured ceramic which is the ultimate product. "Ceramic materials" will be used to refer specifically to the fired or matured ceramic.

The ceramic compositions contemplated by the invention have their principal constituent compositions selected from the binary systems (1) lead titanate-lead zirconate and (2) lead titanate-lead stannate and the ternary system lead titanate-lead zirconate-lead stannate.

Because of their potentially lower cost and their greater durability under adverse atmospheric conditions, ferroelectric ceramic materials have come into prominence in recent years as substitutes for crystals in various transducer applications in the production, measurement and/or sensing of sound, shock vibration, pressures, etc. Among the more promising ceramics for this purpose is lead zirconate titanate, a polycrystalline material composed of $PbZrO_3$ and $PbTiO_3$ effectively in solid solution. In certain ranges of composition on the basis of mol percentages of its constituents, lead zirconate titanate exhibits highly desirable electrical and mechanical properties, particularly, when electrostatically polarized, a high electromechanical coupling. These ranges and examples of preferred compositions and their properties are disclosed with particularity in U.S. Letters Patent Number 2,708,-244, issued on May 10, 1955, to Bernard Jaffe.

Similar to lead zirconate titanate in structure and properties are materials from the ternary system $PbZrO_3$—$PbTiO_3$—$PbSnO_3$ disclosed in detail and claimed in U.S. Letters Patent Number 2,849,404 to B. Jaffe et al. Within certain ranges hereinafter set forth, members of these systems also display marked ferroelectric properties rendering them useful in the same general fields of application as the lead zirconate titanate ceramics. A large number of such compositions from the lead titanate-lead zirconate-lead stannate systems are disclosed in National Bureau of Standards Report No. 3684 (Jaffe, Roth and Marzullo, Report No. 9, October 1, 1954), entitled "Improvements in Piezoelectric Ceramics," and summarized more fully in Research Paper 2626 by the same authors, entitled "Properties of Piezoelectric Ceramics in the Solid-Solution Series Lead Titanate-Lead Zirconate-Lead Oxide:Tin Oxide and Lead Titanate-Lead Hafnate," published in the Journal of Research of the National Bureau of Standards, vol. 55, No. 5, November 1955, pp. 239–254.

Prepolarized ceramics for piezoelectric and electrostrictive applications are a comparatively recent development and while intensive research by workers in the field has succeeded in producing materials acceptable for some commercial purposes, before the full potentialities of these materials can be realized, many problems, some or all of which pertain in varying degrees to all known ferroelectric ceramics, must be overcome.

One of the disadvantages of ceramic transducer materials as compared to naturally piezoelectric crystals is that they require polarization to render them electromechanically responsive. As hereinafter described with greater particularity, polarization of ferroelectric ceramics is accomplished by applying a relatively high electrostatic field across the ceramic piece. While in its general aspects, this is a relatively simple procedure, its practical application frequently is quite difficult for various reasons. One of these reasons is simply that many useful ferroelectric ceramic materials are characterized by high coercivity and, consequently, are inherently difficult to polarize. Examples of high coercivity ceramic materials are lead zirconate titanate compositions containing substitutions of barium strontium and/or calcium for part of the lead. These ceramic materials are very useful in many applications and have the advantage of a high dielectric constant. Ceramic materials of this type are disclosed and claimed in United States Letters Patent No. 2,906,710, and copending application Serial No. 151,847, filed November 13, 1961, and assigned to the same assignee as the present invention.

In order to polarize many ceramic materials, resort is taken to higher polarizing fields or elevated temperatures; these expedients are successful to a degree but the field-temperature conditions applicable are limited by the fact that the resistivity of the ceramic varies inversely with temperatures and, consequently, shorting and/or breakdown of the material occurs before the desired degree of polarization has been attained.

There is also strong inverse dependence of dielectric strength in thickness, so that thick sections are relatively very difficult to polarize. The problem of polarizing is, therefore, particularly acute when dealing with massive pieces and the field must traverse a very appreciable thickness of material, e.g., in the order of an inch or more.

In all cases mentioned hereinabove it will be understood that polarization may sometimes be accomplished, but only with considerable difficulty and then only to a relatively small percentage of the capability of the material.

In consequence of these difficulties, the polarization process applied to some ceramic materials heretofore has been characterized by undesirably high rate of rejections and, in many cases, inadequate polarization.

Another important aspect of the manufacture of ferroelectric ceramic transducers involves the attainment of high density, i.e., densities approaching as closely as possible the density of single crystals of the material.

The density of a ferroelectric ceramic body is intimately interrelated with many of its physical and electrical properties. Aside from the more or less obvious relation between density and mechanical strength, high density is associated also with greater dielectric strength, higher permittivity, lower mechanical dissipation, and better electromechanical coupling.

In order to attain high density in the manufacture of polycrystalline ferroelectric ceramics it is essential that the sintering during the firing process shall eliminate all "open porosity" (i.e., having pores in which liquid or vapor may penetrate from the outer surface) and minimize the proportion of closed porosity (i.e., having pores sealed by surrounding material from inter-communication with the exterior of the body, directly or through contiguous voids). The density of the fired ceramic, of course, increases as the porosity decreases and an ideal ceramic approaches as closely as possible the density of a perfect single crystal of the same material.

In addition to its contribution to low density and the concomitant undesirable effects thereof, open porosity is further highly undesirable because its presence enables the absorption of vapors, liquids and solids adversely effecting such electrical properties as resistivity and dielectric strength. Moreover, during the application of an electrode coating of metal, as by vapor deposition or painting, the electrode metal may penetrate into the open pores of the ceramic.

It is, therefore, a fundamental object of the present invention to overcome at least one of the problems of the prior art as outlined above.

A more specific object of the invention is the provision of novel ferroelectric ceramic compositions characterized by easier polarizability than conventional compositions of generally comparable constituency.

Another object of the invention is the provision of improved ferroelectric ceramic materials which are capable of being polarized to a higher degree and consequently exhibit more favorable piezoelectric properties.

Another object of the invention is to provide novel ferroelectric ceramic compositions of improved sinterability which may be fired at moderate conditions to yield a matured ceramic characterized by low porosity and having a density approaching that of a single crystal of the material.

These and further objects are accomplished by improved ceramic compositions according to the present invention comprising at least 95 percent by weight, in oxidic form, of lead, titanium and zirconium and/or tin in stoichiometric proportions corresponding to lead titanate and lead zirconate and/or lead stannate and containing an additive agent selected from the group consisting of the oxides, and compounds thermally decomposable to give oxides, of iron, nickel and cobalt. The quantity of additive agent is equivalent to .01 to 1.0 weight percent of the respective oxides.

In the ceramic compositions, up to about 25 atom percent of the lead may be substituted for by at least one alkaline earth metal selected from the group consisting of barium, strontium and calcium, and the compositions optionally may include among said 95 percent, also in oxidic form, up to 5 weight percent on an oxide basis in the aggregate of at least one member of the group consisting of tantalum, niobium, and the rare earth elements including yttrium, but excluding cerium, and/or up to about 1.5 weight percent on an oxide basis in the aggregate of at least one member of the group consisting of chromium and uranium.

Additional objects of the invention, its advantages, scope and the manner in which it may be carried into effect will be more readily apparent from the following description and subjoined claims taken in conjunction with the annexed drawing, in which:

Figure 1:
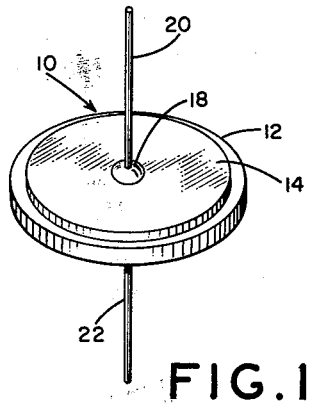
FIGURE 1 is a perspective elevational view of an electromechanical transducer embodying the present invention.
Figure 2:
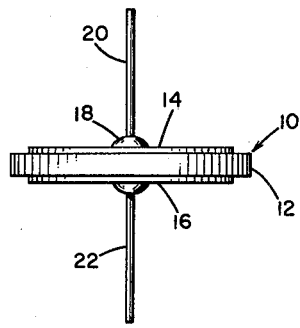
FIGURE 2 is a side elevational view of the transducer shown in FIGURE 1.

Before proceeding with a detailed description of the ferroelectric ceramic materials contemplated by the invention, their application in electromechanical transducers will be described with reference to FIGURES 1 and 2 of the drawings wherein reference character 10 designates, as a whole, an electromechanical transducer having as its active element, a preferably disc-shaped body 12 of a piezoelectric ceramic material according to the present invention.

Body 12 is electrostatically polarized, in a manner hereinafter set forth, and is provided with a pair of electrodes 14 and 16, applied in a suitable manner, on two opposed surfaces thereof. Conductively attached to the electrodes 14 and 16, as by solder 18, are respective wire leads 20 and 22 operative to connect the transducer in the electrical or electronic circuit, not shown, in which it is to be employed. As well known in the art, an electromechanical transducer operates to convert applied electrical energy to mechanical energy, and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes piezoelectric filters, frequency control devices, and the like, and that the invention may also be used and adapted to various other applications requiring materials having dielectric, piezoelectric and/or electrostrictive properties.

As previously mentioned, the present invention is applicable to ferroelectric ceramic compositions of the general type disclosed in the aforementioned U.S. Letters Patent Number 2,708,244 and known as lead zirconate titanate. These materials have a perovskite or pseudo-cubic lattice structure and, in certain $PbZrO_3:PbTiO_3$ mol ratios, are ferroelectric, exhibiting a remarkably high electromechanical coupling when electrostatically polarized. Included within this general category are chemical modifications of, and materials which can be considered as being derived from, lead zirconate titanate. Specifically, a portion or all of the lead zirconate can be replaced by lead stannate. At this juncture it is pointed out that there is some uncertainty and conflict of opinion as to the stability and separate existence of lead stannate; therefore, it is to be understood that lead stannate may be considered as lead oxide (PbO) and tin oxide ($SnO_2$) in the stoichiometric proportions (a mol ratio 1:1) corresponding to the empirical formula $PbSnO_3$.

It is further pointed out that the weight percentages of ingredients hereinafter stated are calculated on the basis of their respective oxides.

From the foregoing, it will be appreciated that the basic compositions fall into three categories: (1) those belonging to the binary system lead zirconate-lead titanate; (2) those belonging to the binary system lead stannate-lead titanate; and (3) those belonging to the ternary system lead zirconate-lead stannate-lead titanate. The designations binary and ternary are used in conjunction with the basic compositions and in disregard of the secondary ingredients.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium. It will also be appreciated that various rare earth metals, because of scarcity and relatively high cost, would not be economically competitive with others though fully operative from the technical standpoint.

Figure 3:
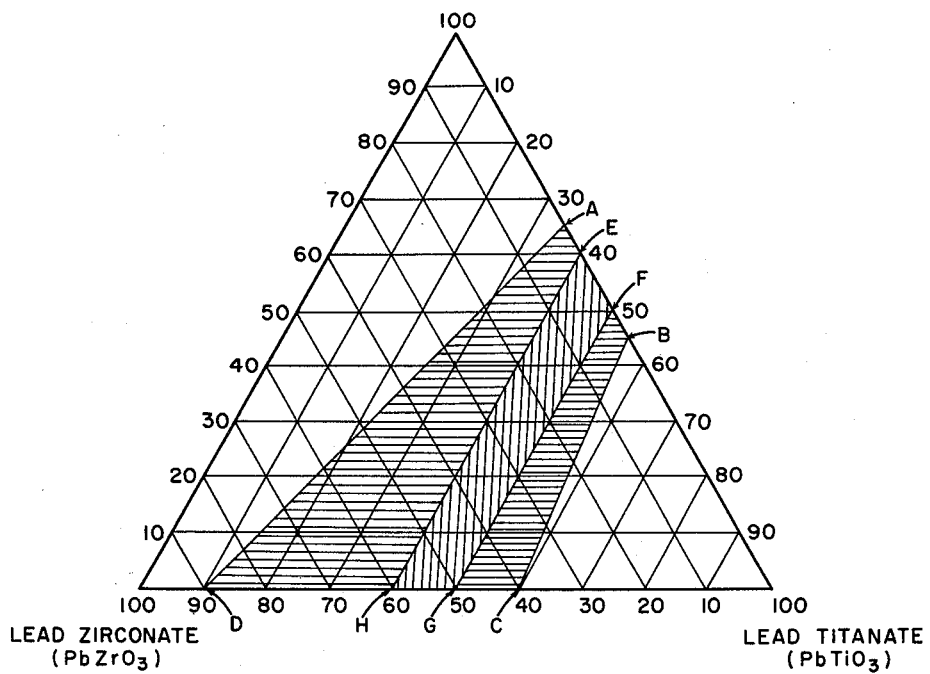
FIGURE 3 is a triangular compositional diagram of the materials utilized in the practice of the present invention.

All possible basic compositions coming within all three of the systems defined above are represented by the triangular diagram constituting FIGURE 3 of the drawings. All compositions represented by the diagram as a whole, however, are not ferroelectric, and many are electromechanically active only to a very slight degree. The basic compositions utilized in the present invention are those exhibiting piezoelectric response of appreciable magnitude. As a matter of convenience, the planar coupling, $k_p$ (also known as radial coupling, $k_r$ and disc coupling $k_{disc}$) of prepolarized test discs, will be taken as a measure of piezoelectric activity. Thus, within the horizontally hatched area bounded by lines connecting points ABCD, FIGURE 3, all basic compositions polarized and tested showed a radial coupling coefficient of at least 0.10. The area bounded by ABCD includes binary lead zirconate-lead titanate solid solutions lying on the line DC along which the mol ratio ($PbZrO_3:PbTiO_3$) of the end components varies from 90:10 to 40:60. Among these base line compositions, those falling between points H and G have characteristically higher radial couplings with the highest couplings occurring where the $PbZrO_3:PbTiO_3$ mol ratio is around 53:47 or 54:46.

The binary basic compositions on line AB ($PbSnO_3$:$PbTiO_3$ from 65:35 to 45:55) of the FIGURE 3 diagram are similar to those on line DC in structure but are characterized by generally lower radial couplings with the best couplings occurring in compositions falling between points E and F, i.e., with the mol ratio $PbSnO_3$:$PbTiO_3$ in the range 60:40 to 50:50.

In the ternary basic compositions within the area designated ABCD, the inclusion of $PbSnO_3$ as a substituent for a portion of the $PbZrO_3$ in the base line compositions has the effect of progressively lowering the Curie temperature but the compositions retain a relatively high radial coupling, particularly in the area of the diagram bounded by lines connecting points EFGH.

As previously mentioned, the basic compositions described above may, if desired, be modified by the substitution of barium, calcium and/or strontium for a part of the lead. This substitution, on an atom basis, is permissible up to a maximum aggregate quantity of 25 percent of barium, calcium and/or strontium, with a preferred range of 5 to 15 percent. The principal effects of this substitution are to raise the dielectric constant and increase coercivity.

Further details, examples, and physical and electrical properties of the basic compositions containing calcium and/or strontium may be had by reference to the aforementioned U.S. Letters Patent No. 2,906,710. Similar information with respect to the effect of barium substitutions for lead in the basic compositions is contained in the aforementioned copending application Serial No. 151,847.

In addition to or in lieu of the substitution of barium, calcium and/or strontium or lead, the basic composition defined in the shaded areas of the FIGURE 3 compositional diagram may be modified by the addition or relatively small quantities of niobium, tantalum and/or certain rare earth elements in oxidic form in accordance with U.S. Letters Patent No. 2,911,370. All rare earth elements including yttrium but excluding cerium are satisfactory and the aggregate quantity of the addition, including tantalum and/or niobium, may range up to a maximum of 5 weight percent computed on an oxide basis.

Another permissible modification of the basic materials is the addition thereto of at least one element from the group consisting of chromium and uranium in an aggregate quantity corresponding on a mol basis to an addition of up to about 1.5 weight percent of chromium oxide ($Cr_2O$). Additional details as to this modification may be had by reference to U.S. Letters Patent No. 3,600,857.

In accordance with the present invention the basic compositions defined by and included within area ABCD of the diagram in FIGURE 3, modified if desired by the substitution of barium, calcium and/or strontium for lead and/or by the addition of niobium, tantalum, yttrium and/or other rare earth elements except cerium and/or the addition of chromium and uranium, are further improved by the inclusion of significant quantities of at least one additive agent selected from the group consisting of iron, nickel and cobalt.

The compositions proposed may be prepared in accordance with various ceramic procedures, which, in themselves are well known in the art.

The preferred method of preparing the basic compositions involves the use of lead oxide (PbO), zirconia ($ZrO_2$) and titania ($TiO_2$), all of relatively pure grade (e.g., C.P. grade), combined in proper proportions. (In some cases a small excess of lead oxide may be employed to balance the additions.) If barium, strontium and/or calcium are to be included, these are added in the form of a reasonably reactive compound. The carbonates of these alkaline earth metals are preferred because of their ready commercial availability at relatively low cost and in suitable purity. In the reacting of the mixtures, carbonates evolve $CO_2$ and reduce to the respective oxides. The optional additions of Nb, Ta, Cr, U and rare earth elements, conveniently as the respective oxides, may also be incorporated into the mix at this time. The combined ingredients are then wet or dry milled to achieve thorough mixing and particle size reduction.

After milling, the mixture, either loose or suitably formed into desired shapes, is pre-reacted by sintering at a temperature of around 850° C. for approximately 2 hours. It is desirable to control loss of lead during the heating by suitable means, such as by carrying out the sintering in an enclosure containing a source of lead oxide vapor as explained in the aforementioned U.S. Letters Patent Number 2,708,244. The specific conditions of sintering will, of course, depend on such variable factors as the size and shape of the batch, and may be selected in accordance with established ceramic techniques to suit the particular case, the object being to approach, as closely as possible, a complete reaction of the mixture.

Following the pre-sintering, the reacted material is allowed to cool and is then crushed and milled to a small particle size. When milling is completed, the pre-sintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The Fe, Ni, and/or Co additive agents may be incorporated into the compositions at any convenient time prior to the final milling, preferably at any early stage of the formation process in order to insure thorough intermixture and particle size reduction. The additive agents may be used in the form of their respective oxides or compounds, such as carbonates, which give the oxide during the firing process. Computed on the basis of the oxides, the minimum effective quantity of the additive agent is approximately 0.01 percent and the maximum about 1.0 weight percent. The oxides used in the preparation of the exemplary compositions hereinafter described were grey cobalt oxide (generally considered as CoO), black nickel oxide (NiO), and red iron oxide ($Fe_2O_3$).

The reacted powder is formed into suitable shapes and fired to ceramic maturity in a manner well known in the art. Additional details of the procedures which may be employed in the compounding and firing of the compositions may be had by reference to the aforementioned U.S. Letters Patent and copending applications.

The fired shapes are polarized in a manner also well known in the art, for example, by applying a pair of electrodes (e.g., 14, 16, FIGURES 1 and 2) to opposite faces of the ceramic bodies and applying an electrostatic field to the electrodes. While the particular conditions of polarization may be varied as desired, D.-C. field strengths of 150 to 175 volts per mil, at room temperature, sustained for one hour have given satisfactory results.

Another method of polarizing, utilized to pole the ceramic bodies on which data are hereinafter presented, is disclosed in U.S. Letters Patent No. 2,928,163. Examples of specific ceramic compositions according to the present invention and various pertinent physical electrical and electromechanical properties thereof are given in Table I hereinbelow in which the various constants and coefficients are defined as follows.

K: dielectric constant; permittivity of the material relative to permittivity of space.

$k_p$: planar piezoelectric coupling coefficient.

Percent D: Dissipation—dielectric loss or power factor measured at 1 kc., expressed in percent.

For the sake of comparison, Table I includes data on a control composition, designated 0, which does not contain additive agents according to this invention.

*Table I*

| Example Number | Basic Molar Composition | Additive Agent, Percent by Weight | Planar Coupling, $k_p$ |
|---|---|---|---|
| 0 | $Pb_{.94}Sr_{.06}(Zr_{.53}Ti_{.47})O_3$ | None | 0.50 |
| 1 | $Pb_{.94}Sr_{.06}(Zr_{.53}Ti_{.47})O_3$ | 0.03 NiO | 0.57 |
| 2 | $Pb_{.94}Sr_{.06}(Zr_{.53}Ti_{.47})O_3$ | 0.05 NiO | 0.56 |
| 3 | $Pb_{.94}Sr_{.06}(Zr_{.53}Ti_{.47})O_3$ | 0.07 NiO | 0.57 |
| 4 | $Pb_{.94}Sr_{.06}(Zr_{.53}Ti_{.47})O_3$ | 0.10 NiO | 0.56 |
| 5 | $Pb_{.95}Sr_{.05}(Zr_{.53}Ti_{.47})O_3$ | 0.70 NiO | 0.58 |
| 6 | $Pb_{.95}Sr_{.05}(Zr_{.53}Ti_{.47})O_3$ | 1.00 NiO | 0.58 |

Table I presents data on significant properties of compositions according to the present invention which comprise the nickel oxide additive agent in a range of from 0.03 to 1.0 percent by weight. The basic composition selected for the purposes of example is lead zirconate titanate containing a 6 atom percent substitution of strontium for lead. The particular composition was selected because, as previously explained, it is characterized by a high coercivity which renders polarization relatively difficult. All specimens included in Table I were polarized under the same conditions, the field strength being 40 kv. per centimeter. The significantly higher values of planar coupling achieved by the compositions containing the additive agent attests to the easier polarizability as compared to the basic composition. Moreover, this benefit is attained without undue detriment to any of the other properties of the material.

Figure 4:
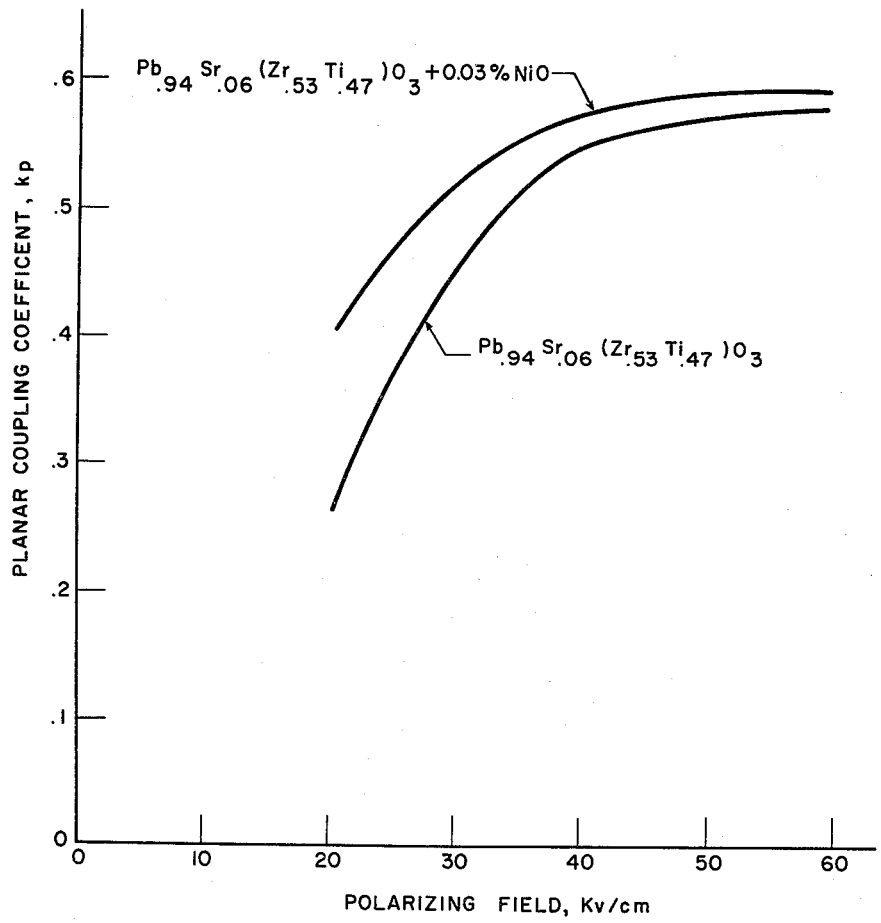
FIGURE 4 is a graph demonstrating the improved polarizability of ferroelectric ceramic materials according to the present invention.

Referring now to FIGURE 4 of the drawing, there is graphically presented a comparison of the polarizability (as indicated by the planar coupling coefficient, $k_p$), of the same basic lead zirconate titanate ceramic, $$Pb_{.94}Sr_{.06}(Zr_{.53}Ti_{.47})O_3$$

with and without additions of nickel oxide. It will be noted that a higher degree of polarization is obtained at all levels of polarizing fields; the difference is more pronounced at lower field strengths, e.g., 20 kv. per centimeter because at fields in excess of 40 kv. per centimeter the specimens approach a saturation of polarization. It will be appreciated, however, that the use of the additive agents enables a much higher degree of polarization at lower fields and permits the polarization of materials which would conduct or break down under higher polarizing potentials.

The benefits of the invention as regards the attainment of higher densities at moderate firing temperatures will be illustrated by reference and comparison to the firing characteristics of the same basic composition listed in Table I, viz., 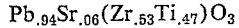. When this composition is shaped and fired to ceramic maturity at the optimum temperature (i.e., 1280–1290° C. for one hour), the product has a density (determined by liquid immersion of 7.3 to 7.45 grams per cc., although the theoretical density is probably about 7.8. A significant part of the difference between theoretical and attained density is due to open porosity. It will be appreciated that both theoretical and attained densities will vary considerably according to the constituency of the particular composition.

In compositions according to the present invention, that is, containing additive agents as hereinabove described, the degree of sintering obtained during the firing process is greatly increased resulting in decreased porosity and, consequently, higher density. In most cases the optimum firing temperature for compositions containing the additive agent is advantageously lower than without the additive. Table II shows, by way of example, the properties of various compositions in accordance with the invention.

*Table II*

[Basic molar composition $Pb_{.94}Sr_{.06}(Zr_{.53}Ti_{.47})O_3$]

| Oxide Additive, Percent by Weight | Firing Temp., ° C. | Density, gms./cc. | Dielectric Constant Polarized | Planar Coupling Coeff. ($K_p$) | Electrical Dissipation, Percent |
|---|---|---|---|---|---|
| None | 1,290 | 7.35 | 1,300 | 0.50 | 0.8 |
| 0.3% CoO | 1,270 | 7.64 | 1,250 | 0.45 | 4.0 |
| | 1,250 | 7.67 | 1,450 | 0.46 | 6.0 |
| | 1,230 | 7.65 | 1,450 | 0.46 | 6.0 |
| | 1,210 | 7.62 | 1,340 | 0.45 | 5.0 |
| 0.1% CoO | 1,270 | 7.64 | 1,250 | 0.45 | 1.9 |
| 0.05% CoO | 1,290 | 7.59 | 1,120 | 0.52 | 1.5 |
| 0.03% CoO | 1,290 | 7.52 | 1,300 | 0.52 | 1.0 |
| 0.1% NiO | 1,290 | 7.64 | 1,020 | 0.54 | 1.0 |
| | 1,270 | 7.64 | 1,250 | 0.56 | 0.9 |
| | 1,250 | 7.63 | 1,310 | 0.55 | 0.8 |
| 0.05% NiO | 1,290 | 7.59 | 1,190 | 0.56 | 0.8 |
| 0.1% $Fe_2O_3$ | 1,290 | 7.61 | 1,010 | 0.51 | 0.9 |

By reference to this table and comparison with the basic composition it will be appreciated that the additive agents result in the attainment of materially higher densities, e.g., 7.5 to 7.7 grams per cc. at firing temperatures the same as or lower than those which produced a density of only 7.35 without the additive agents. It will also be noted that the additive agents do not adversely affect the electrical properties of the material to any appreciable extent and some properties are improved as a result of the greater densification of the body.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A composition of matter consisting essentially of a base material selected from those defined by and included within area ABCD of the diagram of FIGURE 3 and containing at least one member of the group consisting of oxides, and compounds thermally decomposable to give oxides, of iron, nickel, and cobalt in a total quantity equivalent to from .01 to 1.0 weight percent of the respective oxides.

2. A composition of matter according to claim 1 wherein up to 25 atom percent of the lead in said base material is substituted for by at least one alkaline earth element selected from the group consisting of barium, calcium and strontium.

3. A composition of matter according to claim 1 containing at least one member of the group consisting of chromium and uranium in a total quantity corresponding on a mol basis to up to 1.5 weight percent chromic oxide.

4. A composition of matter according to claim 2 containing at least one member of the group consisting of oxides, and compounds thermally decomposable to give oxides, of tantalum, niobium, and the rare earth elements including yttrium but excluding cerium in a total quantity equivalent to up to 5 weight percent of the base material.

5. A composition of matter according to claim 4 wherein said base material is selected from the area EFGH of the diagram of FIGURE 3.

6. A composition of matter consisting essentially of a base material selected from those defined by and included within area ABCD of the diagram of FIGURE 3 and containing at least one member of the group consisting of oxides, and compounds thermally decomposable to give oxides, of iron in a total quantity equivalent to from .01 to 1.0 weight percent of iron oxide.

7. A composition of matter according to claim 6 wherein up to 25 atom percent of the lead in said base material is substituted for by at least one alkaline earth element selected from the group consisting of barium, calcium, and strontium.

8. A composition of matter according to claim 6 containing at least one member of the group consisting of chromium and uranium in a total quantity corresponding on a mol basis to up to 1.5 weight percent chromic oxide.

9. A composition of matter according to claim 7 containing at least one member of the group consisting of oxides, and compounds thermally decomposable to give oxides, of tantalum, niobium, and the rare earth elements including yttrium but excluding cerium in a total quantity equivalent to up to 5 weight percent of the base material.

10. A composition of matter according to claim 9 wherein said base material is selected from the area EFGH of the diagram of FIGURE 3.

11. A composition of matter having essentially the constituency indicated by the formula $$Pb_{.94}Sr_{.06}(Zr_{.53}Ti_{.47})O_3$$

and containing 0.03 to 0.07 weight percent of nickel oxide (NiO).

References Cited in the file of this patent
UNITED STATES PATENTS

| | | |
|---|---|---|
| 2,695,239 | Oshry | Nov. 23, 1954 |
| 2,695,240 | Oshry | Nov. 23, 1954 |
| 2,852,400 | Remeika | Sept. 16, 1958 |
| 2,868,658 | Coffeen | Jan. 13, 1959 |
| 2,911,370 | Kulcsar | Nov. 3, 1959 |